April 17, 1962  W. K. WASDELL  3,029,903
TELESCOPIC DAMPERS PRIMARILY FOR INCORPORATION
IN VEHICLE WHEEL SUSPENSION SYSTEMS
Filed April 29, 1960
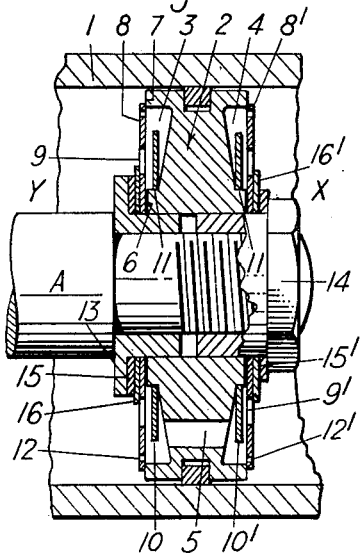
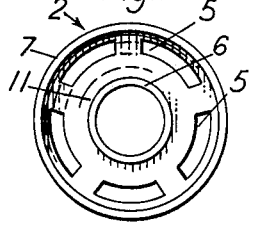
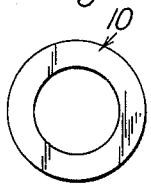
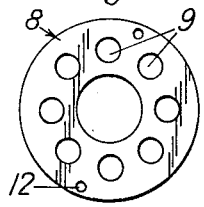
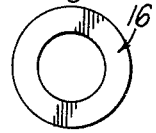
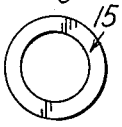
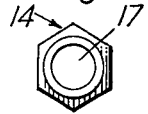
Inventor
WILLIAM KENNETH WASDELL
By Strauch, Nolan + Neale
Attorneys

United States Patent Office 3,029,903
Patented Apr. 17, 1962

3,029,903
TELESCOPIC DAMPERS PRIMARILY FOR INCORPORATION IN VEHICLE WHEEL SUSPENSION SYSTEMS
William Kenneth Wasdell, Highbury Barker Road, Sutton Coldfield, England
Filed Apr. 29, 1960, Ser. No. 25,766
Claims priority, application Great Britain May 6, 1959
6 Claims. (Cl. 188—96)

This invention relates to telescopic dampers primarily, but not exclusively, for incorporation in vehicle wheel suspension systems, and is essentially directed to the single wall type of damper comprising a cylinder which defines a working chamber accommodating a piston, and an axial extension of said chamber defining a recuperation chamber which is divided from the working chamber by a two-way valve device which admits of a controlled flow of liquid damping medium between the working chamber and the recuperation chamber in response to movement of the piston within the working chamber. An example of such a single wall damper is disclosed in the U.S. patent application Serial No. 708,921, filed January 14, 1958.

In a damper of the aforesaid type the piston incorporates a two-way valve assembly for determining the resistance of the fluid damping medium to movement of the piston within the working chamber during the bump or compression stroke of the damper and in the reverse direction during the extension stroke.

In a known form of two-way valved piston assembly there is provided a piston head furnished with two independent sets of axially extending ports or flow passages communicating between opposite sides of the piston head the flow of damping medium therethrough being controlled by sets of valve discs located at each end of the said ports. In this construction the liquid flow in one direction takes place through one set of ports and valve discs and in the opposite direction through the other set of ports and valve discs. This construction suffers the disadvantage that the provision of two sets of independent ports imposes a limitation on the cross-sectional area of each set of ports so giving rise to an unwanted throttling effect on the liquid flow therethrough at high piston speeds.

The present invention has among its objects to provide an improved piston assembly wherein the flow of liquid through the piston head in each direction takes place through a common set of ports thereby affording a greater available cross-sectional area of flow than obtains in the known assembly aforesaid with consequent reduction in the resistance offered by the piston head at high linear speeds of the piston within the working chamber. Other advantages afforded by the present invention will be apparent from the example hereinafter described.

The invention consists of the provision in a single walled telescopic damper of a valved piston assembly comprising a piston head having axially extending ports therethrough, a pair of resilient primary valve discs mounted one on each side of the piston head so as to have peripheral sealing engagement with the piston head for preventing liquid flow between the peripheries of the discs and the piston head until a primary disc is deformed by liquid pressure in a direction to break said seal, a plurality of apertures in each primary disc, and a pair of secondary valve discs located one between each primary disc and the piston head each sealing the apertures in the adjacent primary disc under the influence of liquid pressure in one direction and uncovering said apertures under the influence of liquid pressure in the opposite direction.

Preferred means for carrying the invention into practice will now be described by way of example with reference to the accompanying drawings, wherein:

FIGURE 1 is an axial cross-section of a valved piston assembly according to the invention, and
FIGURES 2, 3, 4, 5, 6 and 7 are end elevations of the separate parts 2, 10, 8, 16, 15 and 14 respectively seen in FIGURE 1 but on a smaller scale.

As seen in the drawings the wall 1 of the working chamber of a single walled type of telescopic damper has slidably mounted therein a piston head 2 secured to the end of the piston rod A axially extending in the bore of the working chamber. The piston head 2 is of generally cylindrical formation having outwardly divergent annular recesses 3 and 4 formed in the two diametral faces of the piston head with communication afforded between the said recesses 3 and 4 by a series of axially extending ports 5 formed in the piston head, the ports having an arcuately elongated shape as seen in FIGURE 2 so as to offer a large cross-sectional area available for the flow of liquid damping medium therethrough and therefore little resistance to liquid flow at high piston speeds. Mounted on the flat lands 6 and 7 on the diametral faces of each side of the piston head is a primary valve disc 8 and 8' composed of spring metal which discs are held pressed as later described against the said lands 6 and 7 so as to establish sealing engagement between the periphery of each primary disc and the land 7 on the piston head to prevent the flow of liquid damping medium between the periphery of the primary valve discs and the piston head until a primary disc is bowed by liquid pressure thereon so as to separate the periphery of the primary disc from the valve head and so permit flow therebetween.

Each primary disc 8, 8' is provided with an annular row of circular apertures 9, 9' therein which permit free flow of fluid therethrough. The flow through the apertures 9, 9' is controlled by a pair of secondary annular valve discs 10, 10' arranged one between each primary disc 8, 8' and the respective face of the piston head 2 with limited axial floating movement on the cylindrical shoulders 11 defined between the lands 6 and recessed areas 3 and 4 of each side of the piston head 2 whereby each secondary disc can freely move so as to close or to uncover the apertures 9, 9' in the primary discs under the influence of the liquid pressure arising from movement of the piston in the working chamber.

It is to be noted that by virtue of the outwardly divergent form of the recesses 3 and 4 in the piston head the secondary valve discs 10, 10' are permitted a dish-like deformation at high piston speeds so that a small amount of bodily movement of the secondary valves on the shoulders 11 can be provided to give little time delay in the shutting of the secondary valves in relation to the primary valve discs, whilst at the same time permitting a considerable opening at the periphery of the secondary discs so as to reduce the resistance offered to the liquid flow through the apertures in the primary discs at high piston speeds.

To permit the flow of liquid through the piston assembly at low linear speeds of the piston without opening any of the control valves the primary valve discs are furnished outside the circumference of the secondary discs with small bleed holes 12, 12', it being noted that the bleed holes provided in one primary disc are only effective in one direction of flow and may be ignored in relation to the area of the ports 9, 9' in the opposite direction of flow. Therefore the bleed holes in the two primary discs may be differing size in order to afford different resistances to piston movement in opposite directions.

The primary discs 8, 8' are normally held in pressed engagement against the lands 6 and 7 of the piston head when the piston 2 is stationary by means of a pair of flanged bushes 13 and 14 mounted on the reduced end of the piston rod A with the piston rod in screw threaded engagement with a tapped bore 17 of the outermost bush 14, and with washers 15, 15', and 16, 16' located between the collars and valve discs as necessary.

In operation and considering the liquid flow from X to Y on opposite sides of the piston assembly during the compression stroke of the piston within the working cylinder the pressure at X will act through the apertures 9' to displace the secondary disc 10' away from the primary disc 8' so uncovering the apertures 9' and permitting substantially unrestricted flow of damping medium through the primary disc 8', the recess 4, and the ports 5 in the piston head into the recess 3 on the opposite side of the disc wherein the secondary disc 10 is pressed against the primary valve disc 8 so as to cover the apertures 9. The pressure of the liquid then acts on the primary valve disc 8 so as to dish or bow the disc and break the sealing engagement of the periphery of the primary disc with the land 7 on the piston head and so permit a restricted flow of fluid therebetween as determined by the stiffness of the disc 8.

During the reverse stroke of the piston in the working chamber, that it is to say during the extension stroke, the pressure of the liquid on the side Y acts to separate the secondary valve disc 10 from the primary valve disc 8 so as to uncover the apertures 9 and permit free flow through the apertures 9, the recess 3, and through the ports 5 into the recess 4 on the opposite side of the piston head wherein the liquid pressure presses the secondary valve disc 10' against the primary valve disc 8' so as to close the apertures 9' and cause the primary disc 8' to bow and so admit of a restricted liquid flow between the periphery of the disc 8' and the land 7 of the piston head as determined by the stiffness of the disc 8'.

It will be appreciated that the above described valve assembly possesses the advantage that the resistance offered by each primary valve disc 8, 8' can be independently determined in manufacture according to the level of the land 7 in relation to the land 6. Alternatively the stiffness of the primary valve discs may be varied by selection of the thickness of the disc or by the provision of supporting washers to influence the rates of flexibility of the discs.

I claim:

1. In a single walled telescopic damper, a valved piston assembly comprising a piston head having axially extending ports therethrough, a pair of resilient primary valve discs mounted one on each side of the piston head so as to have peripheral sealing engagement with the piston head for preventing liquid flow between the peripheries of the discs and the piston head until a primary disc is deformed by liquid pressure in a direction to break said seal, a plurality of apertures in each primary disc, a pair of secondary valve discs located one between each primary disc and the piston head, and means mounting each of said secondary valve discs for free movement over a limited distance axially between said head and the associated primary valve disc under liquid pressure, each of said secondary discs being adapted for sealing the apertures in the adjacent primary disc under the influence of liquid pressure in one direction and uncovering said apertures under the influence of liquid pressure in the opposite direction whereby said ports controlled by said valves admit fluid flow in both directions through said piston assembly during operation.

2. A damper according to claim 1, wherein the two opposite sides of the piston head are formed with outwardly divergent annular recesses.

3. A damper according to claim 1, wherein at least one primary valve disc has a bleed hole radially outside the area engaged by the adjacent secondary valve disc.

4. A damper according to claim 1, wherein said head is formed with radially spaced flat annular lands on its opposite sides adjacent its central portion and adjacent its outer periphery respectively, and means are provided for clamping the primary valve discs against said flat lands.

5. In a liquid damper wherein a piston assembly reciprocates within a liquid containing cylinder, means providing a piston assembly capable of passing liquid therethrough in either direction through the same set of valved axial ports comprising a piston head having a plurality of axial through ports distributed circumferentially thereof, said head being recessed at each side about the ends of said ports, resilient primary valve discs one at each side of the head extending over said recesses, means urging said primary valve discs into liquid sealing contact with the sides of said head both radially inwardly and outwardly of said recesses, each of said primary valve discs having at least one aperture, and secondary valve discs mounted for limited axial sliding movement on said head between positions of axial abutment with the head and engagement with the primary valve discs to close said apertures, whereby when said piston assembly is moved in either direction the forward most secondary valve disc is moved by liquid pressure to uncover the associated primary valve disc aperture and liquid flows through said recesses and ports to urge said other secondary valve disc to first close its associated primary valve disc aperture and then upon build up of sufficient liquid pressure deform said associated primary valve disc to break its sealing engagement with the head outwardly of said recesses.

6. In the assembly defined in claim 5, said primary valve discs each having bleed openings for bypassing liquid when said apertures are closed, and the bleed openings on one side of the head being of larger area than those on the other side to provide different resistance to piston movement in opposite directions.

References Cited in the file of this patent

UNITED STATES PATENTS

| | | |
|---|---|---|
| 2,060,590 | Padgett | Nov. 10, 1936 |
| 2,346,275 | Read et al. | Apr. 11, 1944 |
| 2,467,098 | Rossman | Apr. 12, 1949 |

FOREIGN PATENTS

| | | |
|---|---|---|
| 1,080,670 | France | June 2, 1954 |
| 1,089,099 | France | Sept. 22, 1954 |